United States Patent [19]
Kotani et al.

[11] 3,912,529
[45] Oct. 14, 1975

[54] GLYOXAL COMPOSITION

[75] Inventors: Yasuo Kotani, Hirakata; Kunio Kageyama, Amagasaki, both of Japan

[73] Assignee: Nippon Gohsei Kagaku Kogyo Kabushiki Kaisha, Osaka, Japan

[22] Filed: Jan. 17, 1974

[21] Appl. No.: 434,339

[30] Foreign Application Priority Data

| Jan. 19, 1973 | Japan | 48-9049 |
| Feb. 1, 1973 | Japan | 48-13929 |
| Apr. 14, 1973 | Japan | 48-42610 |
| July 9, 1973 | Japan | 48-77651 |
| July 13, 1973 | Japan | 48-79549 |

[52] U.S. Cl............ 106/187; 106/213; 260/29.6 B; 252/316
[51] Int. Cl.²............................. C08L 3/04
[58] Field of Search ........... 106/213, 187; 260/29.6, 260/29.6 B; 252/316

[56] References Cited
UNITED STATES PATENTS

| 2,999,032 | 9/1961 | Dekker | 106/213 |
| 3,445,353 | 5/1969 | Harendza-Harinxma | 204/56 |

OTHER PUBLICATIONS
Chem. Abst., p. 3562, 1938, Vol. 32.

*Primary Examiner*—Theodore Morris
*Attorney, Agent, or Firm*—Armstrong, Nikaido & Wegner

[57] ABSTRACT

A non-fluid glyoxal composition prepared by admixing glyoxal, a water-soluble polymeric material and water, in which the ratio of glyoxal and the water-soluble polymeric material is in the range of about 1:2 to about 50:1 and water content is in the range of about 5 to about 90% by weight in the composition, which is useful as a deodorant.

4 Claims, No Drawings

GLYOXAL COMPOSITION

BACKGROUND OF THE INVENTION

The present invention relates to a novel nonfluid glyoxal composition comprising glyoxal, a watersoluble polymeric material and water in the specific ratio, and more particularly relates to a glyoxal composition which maintains a form of non-sticky, nonhygroscopic powder in spite of large glyoxal content and shows similar chemical properties to those of aqueous solution of glyoxal.

Glyoxal has been widely employed in various uses such as starting materials for organic reagents, finishing agents for fibers or paper, deodorant, soil stabilizer, and the like. In general, glyoxal is manufactured from ethylene or acetaldehyde by oxidation reaction, and usually it is obtained in the market as an aqueous solution no more than 40 % by weight. It is extremely difficult to concentrate an aqueous solution of glyoxal to more than 40 % by weight by a conventional process, such as evaporation or spray drying, since the aqueous solution changes to highly viscous to form polyglyoxal.

On the other hand, it has been known that polyglyoxal is obtained in a form of powder. However, polyglyoxal is not so advantageous, because it is expensive for the complicated manufacturing and difficult to handle due to its hygroscopic.

If it becomes possible to obtain cheaply glyoxal in high concentration, it can be expected that the cost for transportation will be decreased and novel use and application will be developed. Further if it becomes possible to obtain the non-fluid glyoxal, for instance, in a form of block, pellet or powder, it also can be expected that novel use and application differing from a conventional aqueous solution of glyoxal will be developed.

There has been disclosed in U.S. Pat. No. 2,549,177 a composition comprising starch, glyoxal and water. However, the ratio of glyoxal and starch in this composition is 1 : 50 to 1 : 20 and the composition is in liquid, different from the composition of this invention.

OBJECT OF THE INVENTION

It is an object of the present invention to provide a novel non-fluid glyoxal composition.

Another object of the invention is to provide a jellied glyoxal composition.

Further object of the invention is to provide a solidified glyoxal composition.

More further object of the invention is to provide a process for preparing a solidified glyoxal composition by simple means.

Still further object of the invention is to provide novel application for glyoxal.

These and other objects of the invention will become apparent from the description hereinafter.

DESCRIPTION OF THE INVENTION

It has now been found that the above-mentioned objects are accomplished in the basis of discovering the fact that an aqueous solution of glyoxal loses its fluidity when a water-soluble polymeric material is dissolved into the solution in the specific ratio to glyoxal.

In the present invention, the term "non-fluid" means that the present glyoxal composition is not in a form of liquid, i.e. is in a form of jelly or solid.

According to the present invention, it is essential that the ratio of glyoxal and a water-soluble polymeric material should be in the range of about 1 : 2 to about 50 : 1 by weight, especially about 1 : 1 to about 50 : 1 by weight, and water is in the range of about 5 to about 90 % by weight in the composition, and these components should be homogeneously admixed. The composition containing glyoxal of less than above remains in liquid form as shown in the above-mentioned U.S. Patent. The composition containing water of more than about 90 % by weight is a viscous liquid even if the ratio of glyoxal to the water-soluble polymeric material is within the above-mentioned range. It is impossible to reduce the water content in the composition to less than 5 % by weight because glyoxal per se has the property apt to hydrate. The composition containing water in the range of about 40 to about 90 % by weight in the composition is in a form of jelly having nontackiness, transparency and flexibility, and can be molded into a desired form such as powder, pellet, stick, plate or block. The composition containing water of less than about 40 % by weight, especially less than about 25 % by weight in the composition is a solid matter freed from hygroscopic and tackiness. The composition of such a solid type can also be molded into a desired form such as powder, granule, pellet or block. Especially, the composition having the water content of less than about 25 % by weight can become very fine powder.

When the glyoxal composition of the present invention is put in water, glyoxal is eluted from the composition and the water-soluble polymeric material in the composition is gradually dissolved in water. Therefore, there is not a bit of difference between chemical properties of the aqueous solution obtained from the present composition and those of a conventional aqueous solution of glyoxal. It is not too much to say that the glyoxal composition is solid glyoxal since a content of a water-soluble polymeric material is very small and the composition can be handled as glyoxal without any trouble.

A water-soluble polymeric materials employed in the present invention are water-soluble polyvinyl alcohol and the derivatives thereof, water-soluble starch derivatives and water-soluble cellulose derivatives. Examples of the water-soluble polyvinyl alcohol derivatives are polyvinyl butyral, urethanated polyvinyl alcohol, hydrolyzed copolymer of vinyl acetate and ethylene or α-olefin, water-soluble hydrolyzed copolymer of vinyl acetate and acrylic acid, methacrylic acid, crotonic acid, maleic acid or esters thereof, and the like. Examples of the water-soluble starch derivatives are soluble starch, oxidized starch, hydroxyethyl starch, and the like. Examples of the water-soluble cellulose derivatives are an alkali salt of carboxymethyl cellulose, methyl cellulose, hydroxypropylmethyl cellulose, ethylmethyl cellulose, hydroxyethyl cellulose, ethylhydroxyethyl cellulose, and the like. These water-soluble polymeric materials can be employed alone or as a mixture.

According to the present invention, the glyoxal composition of jelly type is prepared by adding a watersoluble polymeric material or an aqueous solution thereof to an aqueous solution of glyoxal commercially sold in the specific ratio to glyoxal as mentioned above and admixing them homogeneously. The mixture is jellied only by uniformly admixing them at any temperature. In case of employing a water-soluble polymeric material in a solid form such as powder, the heating is efficient to shorten the period for preparing a uniform composition. For the purpose of preparing the composition of less water content, it is a practical method to remove water out of the composition having a larger water content by a conventional method, such as heating under a normal or reduced pressure. For example, it is practically impossible to prepare the composition having the ratio of glyoxal : polyvinyl alcohol = 1 : 1 and the water content of 25 % by weight by means of directly admixing of the glyoxal solution and polyvinyl alcohol because an aqueous solution of glyoxal can be obtained no more than that in a concentration of at most 40 % by weight.

The glyoxal composition of solid type is prepared by drying the composition of jelly type. The composition of solid type obtained in a form of block can be readily crushed into fine powder. Also, the composition of solid type in a desired form such as powder, granule or pellet can be obtained by molding the composition of jelly type into a desired mold and drying it.

In accordance with the necessity, the composition of the invention can be added with additives, in a required quantity, such as dyestuff, pigment, surface active agent, filler, perfume, antiseptic, germicide, and the like.

The composition of the invention contains glyoxal in a high concentration and is basically applicable to the same uses as in a conventional glyoxal solution. However, since the composition has the non-fluidity, modified applications can be developed.

One embodiment of the present composition can be utilized as a deodorant of new type. When the composition is put into water including a bad odor such as ammonia, amines, hydrogen sulfide or mercaptans, the glyoxal in the composition elutes gradually into the water and the deodorant effect can be maintained for a longer period than in case of glyoxal solution.

The powdery composition containing glyoxal in the ratio of more than one part by weight to one part by weight of the water-soluble polymeric material and water of less than about 25 % by weight, contains glyoxal in extremely so high concentration and has large surface area that the composition has the good effect on deodorizing even in air by contacting with it.

The powder composition can be employed as a deodorant for wrapping paper. When the paper making is carried out in the presence of the powdery composition, the paper obtained can contain glyoxal in high yield in comparison with employing a conventional aqueous solution of glyoxal. Thus obtained paper does not lose the flexibility and is useful for wrapping paper for materials emitting bad odors such as fish, shell or meat. In case of employing the composition as a deodorant, the effect can be increased by adding perfumes such as coumarin, vanillin, Eau de Cologne, geranyl crotonate or lauryl methacrylate, glyoxylic acid, malic acid, citric acid, and the like.

The present invention is more particularly described and explained by means of the following illustrative Examples, in which all percentages are by weight except as noted.

EXAMPLE 1

A 2 liter vessel was charged with 950 g. of 40 % aqueous solution of glyoxal, and thereto 50 g. of powdery polyvinyl alcohol (degree of polymerization: 1,700, degree of hydrolysis: 99.4 % by mole) was gradually added with agitation. After completion of addition, the mixture was heated at a temperature of 40° to 50°C. to dissolve polyvinyl alcohol completely. Then, the solution was poured into a mold and allowed to stand for cooling. After 24 hours, the mold was removed and a jellied composition was obtained. The composition was excellent in flexibility and transparency.

EXAMPLE 2

The same procedure as in Example 1 was repeated except that 900 g. of 17 % aqueous solution of glyoxal and 100 g. of powdery polyvinyl alcohol (degree of polymerization: 1,700, degree of hydrolysis: 99.4 % by mole) were employed and to give a transparent jellied composition.

EXAMPLE 3

A 2 liter vessel was charged with 700 g. of 40 % aqueous solution of glyoxal, and thereto 300 g. of powdery polyvinyl alcohol (degree of polymerization: 1,700, degree of hydrolysis: 99.4 % by mole) was gradually added with agitation. Then, the mixture was heated at a temperature of 50° to 60°C. and the agitation was further continued with maintaining the same temperature to form a jellied composition. The obtained composition was excellent in flexibility and transparency.

EXAMPLE 4

The same procedure as in Example 1 was repeated except that 50 g. of hydrolyzed ethylene-vinyl acetate copolymer (ethylene content: 5 % by mole, degree of hydrolysis of vinyl acetate units: 98 % by mole) was employed instead of polyvinyl alcohol and the mixture was heated at a temperature of 50° to 60°C. The obtained jellied composition was excellent in flexibility and transparency.

EXAMPLE 5

A 2 liter vessel was charged with 970 g. of 40 % aqueous solution of glyoxal, and thereto 30 g. of powder of hydrolyzed vinyl acetate-crotonic acid copolymer (crotonic acid content: 0.7 % by mole, degree of hydrolysis of vinyl acetate units: 99 % by mole) was added with agitation. The agitation was continued to dissolve the powder. Then, the obtained solution was allowed to stand to form a jellied composition.

EXAMPLE 6

The same procedure as in Example 5 was repeated except that 30 g. of powder of hydrolyzed vinyl acetatemonomethyl maleate copolymer (monomethyl maleate content: 1.1 % by mole, degree of hydrolysis of vinyl acetate units: 99.5 % by mole) was employed as a water-soluble polymeric material. The obtained jellied composition had the excellent flexibility and the transparency.

EXAMPLE 7

A 2 liter vessel was charged with 1,000 g. of 40 % aqueous solution of glyoxal, and thereto 20 g. of sodium carboxymethyl cellulose was gradually added with agitation. After completion of addition, the mixture was agitated at a temperature of 80° to 95°C. by kneader. After dissolving the powder, the solution was allowed to stand to form a translucent jellied composition having flexibility.

Thus obtained composition was put in 100 ml. of water in an amount of 5 g., and allowed to stand at a temperature of 60°C. After one hour, the composition completely dissolved in water to give an aqueous solution of glyoxal. The glyoxal concentration of the solution was measured and the glyoxal content of the jellied composition was calculated from the concentration. The glyoxal content of the composition was 41 %.

EXAMPLE 8

The same procedure as in Example 7 was repeated except that 1,000 g. of 20 % aqueous solution of glyoxal and 10 g. of sodium carboxymethyl cellulose were employed, and a translucent jellied composition was obtained.

In 100 ml. of water, 5 g. of the obtained composition was put. Then, the composition was allowed to stand for one hour at a temperature of 60°C. to dissolve the composition completely. The glyoxal concentration of the solution was measured and the glyoxal content of the composition was calculated. The content was 21.3 %.

EXAMPLE 9

The same procedure as in Example 7 was repeated except that 100 g. of soluble starch was employed instead of sodium carboxymethyl cellulose to give a jellied composition.

The obtained composition was taken in an amount of 5 g. and put in 100 ml. of water. Then the composition was allowed to stand for one hour at a temperature of 60°C. to give an aqueous solution of glyoxal. By the measurement of glyoxal concentration of the solution, it was confirmed that approximately all of glyoxal in the composition eluted into water.

The jellied composition was crushed into granule having an average particle size of about 2 mm. by kneader. Thus obtained granules were spread all over the bottom of the cylindrical vessel having a diameter of 46 cm. and a height of 60 cm. in an amount of 100 g. Then, ammonia gas was introduced into the vessel in the concentration of about 80 p.p.m. and the vessel was immediately sealed. After allowing to stand for 3 hours at a temperature of 20°C., the vessel was opened but there is no smell.

EXAMPLE 10

A 2 liter vessel was charged with 950 g. of 40 % aqueous solution of glyoxal, and thereto 50 g. of powdery polyvinyl alcohol (degree of polymerization: 1,700, degree of hydrolysis: 99.4 % by mole) was gradually added with agitation. After completion of addition, the mixture was heated at a temperature of 40° to 50°C. to dissolve polyvinyl alcohol completely. The solution was allowed to stand to give a jellied composition. The obtained composition contained 38 % of glyoxal, 5 % of polyvinyl alcohol and 57 % of water.

The composition was dried with crushing into granule by kneader at a temperature of 85° to 90°C. The obtained granule was rigid and had an average particle size of about 1 mm. The granular composition contained 79.5 % of glyoxal, 10.4 % of polyvinyl alcohol and 10 % of water.

The granular composition was further milled to give a fine powder having an average particle size of about 300 μ which has an excellent flowability. The powder was allowed to stand in a room, but scarcely adsorbed water in air and did not show tackiness.

EXAMPLE 11

The jellied composition obtained in Example 3 was dried with crushing by kneader at a temperature of 85° to 90°C. A rigid granular composition having an average size of about 0.5 mm. was obtained. The rigid composition contained 37 % of glyoxal, 40 % of polyvinyl alcohol and 23 % of water.

EXAMPLE 12

A 2 liter vessel was charged with 1,000 g. of 40 % aqueous solution of glyoxal, and thereto 50 g. of sodium carboxymethyl cellulose was gradually added with agitation. After completion of addition, the mixture was transferred into a kneader and the agitation was continued for 3 hours at a temperature of 80° to 95°C. to give white granules having an average particle size of about 0.5 mm. The granular composition contained 80 % of glyoxal, 10 % of sodium carboxymethyl cellulose and 10 % of water.

EXAMPLE 13

The same procedure as in Example 10 was repeated except that 1,000 g. of 20 % aqueous solution of glyoxal and 200 g. of powdery polyvinyl alcohol (degree of polymerization: 1,700, degree of hydrolysis: 87 % by mole) were employed to give a solidified granular composition having an average particle size of about 1 mm.

Thus obtained composition contained 42 % of glyoxal, 42 % of polyvinyl alcohol and 16 % of water.

EXAMPLE 14

The granular composition obtained in Example 10 was spread all over the bottom of the cylindrical vessel having a diameter of 46 cm. and a height of 60 cm. in an amount of 100 g. Then, ammonia gas was introduced into the vessel in the concentration of about 80 p.p.m. and the vessel was immediately sealed. After allowing to stand for 24 hours at a temperature of 20°C., the vessel was opened but there was no smell.

In order to compare the effect of deodorizing, 100 g. of granular active carbon was spread all over the bottom of the same cylindrical vessel and the same test as in the above was repeated. However, the strong smell of ammonia remained in the vessel.

EXAMPLE 15

A 2 liter vessel was charged with 700 g. of 40 % aqueous solution of glyoxal, and thereto 300 g. of powdery polyvinyl alcohol (degree of polymerization: 1,700, degree of hydrolysis: 99.4 % by mole) was gradually added with agitation and further 20 g. of lauryl methacrylate was added. Then the mixture was heated at a temperature of 80° to 90°C. and the agitation was continued at the same temperature to give a jellied composition being excellent in flexibility.

The jellied composition was put in a kneader and dried at a temperature of 80° to 95°C. with crushing into granules having an average particle size of about 2 mm. to give a rigid granular composition containing 7 % of water.

The same cylindrical vessel as in Example 14 was employed in order to spread with a mixture consisting of 40 parts by weight of the granular composition obtained in the above, 40 parts by weight of granular active carbon and 20 parts by weight of bleaching powder. Then a plate was fixed in the vessel and 300 g. of the mixture of guts, head and bone of ray was put on the plate. The vessel was immediately sealed and allowed to stand for 24 hours at a temperature of 25° to 30°C. There was no unpleasant smell.

EXAMPLE 16

A solidified granular composition was obtained by the same manner as in Example 15 except that 900 g. of 17 % aqueous solution of glyoxal, 100 g. of powdery polyvinyl alcohol and 50 g. of malic acid. The composition had an average particle size of about 1 mm.

Thus obtained solidified composition containing 8 % of water was packed in a cotton bag in an amount of 500 g., and the bag was fixed in a water tank of a water-closet being capable of intermittently flushing. The water-closet was controlled by a syphon so as to drain away at intervals of about 30 minutes and each time the composition was put in water. As a result, unpleasant smell in a toilet room disappeared and its deodorizing effect lasted for 9 days.

EXAMPLE 17

A small-sized kneader having the capacity of 2 liters was charged with 1,000 g. of 40 % aqueous solution of glyoxal and 50 g. of powdery polyvinyl alcohol (degree of polymerization: 1,600, degree of hydrolysis: 99.4 % by mole). The temperature was elevated to about 80° to 90°C. with agitation. The viscosity of the mixture increased with the dissolution of the powder and eventually a flexible jellied composition was obtained. The composition was further heated at the same temperature with agitation to proceed the crushing and drying. The heating was continued for 4 hours and a white powdery composition was obtained. The obtained powder was further dried at a temperature of 90° to 100°C. for 2 hours under a normal pressure. Thus dried powders were sieved to obtain powders having a particle size of 50 to 100 meshes. The powder contained 80 % of glyoxal, 10 % of polyvinyl alcohol and 10 % of water.

To 50 g. in dry weight of kraft pulp substantially beaten were added 2.5 g. of thus obtained powdery composition and 16.6 liters of water, and then the mixture was agitated to disperse uniformly. A TAPPI standard sheet machine (20 cm. X 25 cm.) was charged with one liter of the obtained dispersion, and thereto 10 liters of water was further added to form a sheet. Then the obtained sheet was dried to give a paper having a basis weight of 60 g./m$^2$. A 81.2 % of the employed composition was fixed to the paper.

Thus obtained paper was put into the syringe filled with ammonia gas at 20°C. The amount of ammonia adsorbed in the paper was 2,650 ml./m$^2$., while that in the blank paper was 1,380 ml./m$^2$.

What is claimed is:

1. A non-fluid glyoxal composition comprising glyoxal, water and at least one member selected from the group consisting of polyvinyl alcohol, water-soluble polyvinyl alcohol derivatives and water-soluble cellulose derivatives; the ratio of glyoxal and the water-soluble polymeric material being in the range of about 1 : 2 to about 50 : 1 and water being in the range of about 5 to about 90% by weight in the composition.

2. A glyoxal composition of jelly type comprising glyoxal, water and at least one member selected from the group consisting of polyvinyl alcohol, water-soluble polyvinyl alcohol derivatives and water-soluble cellulose derivatives; the ratio of glyoxal and the water-soluble polymeric material being in the range of about 1 : 2 to about 50 : 1 and water being in the range of about 40 to about 90% by weight in the composition.

3. A glyoxal composition of solid type comprising glyoxal, water and at least one member selected from the group consisting of polyvinyl alcohol, water-soluble polyvinyl alcohol derivatives and water-soluble cellulose derivatives; the ratio of glyoxal and the water-soluble polymeric material being in the range of about 1 : 2 to about 50 : 1 and water being in the range of about 5 to about 25% by weight in the composition.

4. A process for preparing a glyoxal composition of solid type which comprises homogeneously admixing an aqueous solution of glyoxal and at least one member selected from the group consisting of polyvinyl alcohol, water-soluble polyvinyl alcohol derivatives and water-soluble cellulose derivatives to give a jellied composition in which the ratio of glyoxal and the water-soluble polymeric material is in the range of about 1 : 2 to about 50 : 1 and water is in the range of about 40 to about 90% by weight in the composition, and reducing water content of said jellied composition to the range of about 5 to about 25% by weight.

* * * * *